United States Patent [19]

DiRocco et al.

[11] 4,333,508
[45] Jun. 8, 1982

[54] TIRE REPAIR PATCH FOR SIDEWALL AND BEAD REPAIRS

[76] Inventors: Jobbie DiRocco, 3424 Sweetbriar Ave., Akron, Ohio 44321; David J. DiRocco, 7090 Grove Rd., Clinton, Ohio 44216

[21] Appl. No.: 268,874

[22] Filed: Jun. 1, 1981

[51] Int. Cl.³ ................. B60C 21/02; B60C 21/04
[52] U.S. Cl. .................................... 152/367; 152/370; 156/97
[58] Field of Search ............... 152/367, 370, 371; 156/94, 97

[56] References Cited

U.S. PATENT DOCUMENTS

| | | | |
|---|---|---|---|
| 3,080,907 | 3/1963 | Barrett | 152/367 |
| 3,133,585 | 5/1964 | Iknayan | 152/367 |
| 3,260,296 | 7/1966 | Claxton | 152/367 |
| 3,332,466 | 7/1967 | Wolfe | 152/367 |
| 4,285,382 | 8/1981 | DiRocco et al. | 152/367 |

Primary Examiner—William R. Dixon, Jr.
Attorney, Agent, or Firm—Frederick K. Lacher

[57] ABSTRACT

A tire sidewall repair patch having overlapping plies of reinforcing cords positioned in the patch. An inner margin of the patch has a concave edge which conforms generally to the shape of a bead portion of a tire. The side edges are connected to a generally convex outer edge to reduce edge pulling. The reinforcing cords are concentrated in the central portion adapted to cover the tire injury. Flexibility of the side portions at the inner margin is provided by reducing the number of plies extending into the side portions.

12 Claims, 6 Drawing Figures

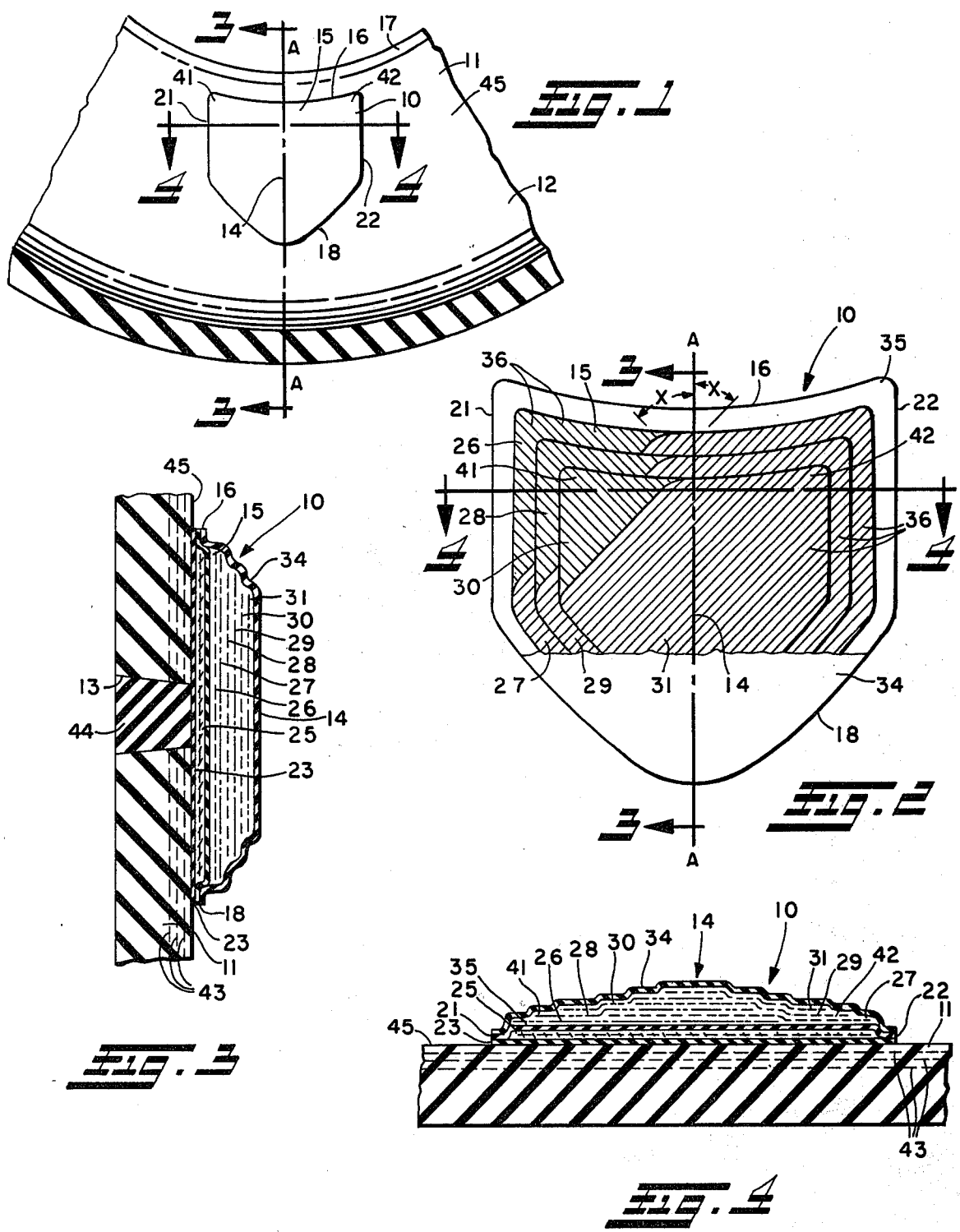

TIRE REPAIR PATCH FOR SIDEWALL AND BEAD REPAIRS

BACKGROUND OF THE INVENTION

In the past tire patches made for repairs to other parts of a tire have been used for repairing the sidewalls and beads. These patches have been generally square and it has been difficult to place them over an injury close to the bead. In some cases a concave cutout has been provided at one corner so that the patch can be placed closer to the bead. This has resulted in a patch which has thick edges without the desired flexibility. This construction may cause edge cracking and breaking loose of the patch from the tire. The edges of the patches have also had recesses and points which may cause undesirable edge pulling of the patch.

SUMMARY OF THE INVENTION

The present invention is directed to a multiple ply tire patch which can be applied effectively to a sidewall tire injury relatively close to the bead of the tire. The configuration of the reinforcing plies is such that the side portions of the inner margin of the patch are relatively thin for flexibility. Also the edges do not have recesses or points causing undesirable edge pulling. At the same time the patch incorporates an intermediate cushion gum layer for distributing the forces transmitted through the patch at the injured portion of the tire. The invention may be used in sidewall patches for bias ply and radial tires.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but two of the various ways in which the principles of the invention may be employed.

BRIEF DESCRIPTION OF THE DRAWINGS

FIG. 1 is a fragmentary sectional view of a tire showing the inner surface of the sidewall with a tire repair patch bonded to the inner surface in the vicinity of the tire bead portion.

FIG. 2 is an enlarged cutaway view of the patch shown in FIG. 1 showing the position of the plies in the central portion and in the side portions of the inner margin.

FIG. 3 is a sectional view of the patch and sidewall taken along line 3—3 in FIG. 1.

FIG. 4 is another sectional view of the patch and sidewall taken along line 4—4 in FIGS. 1 and 2.

DETAILED DESCRIPTION

Figure 5:
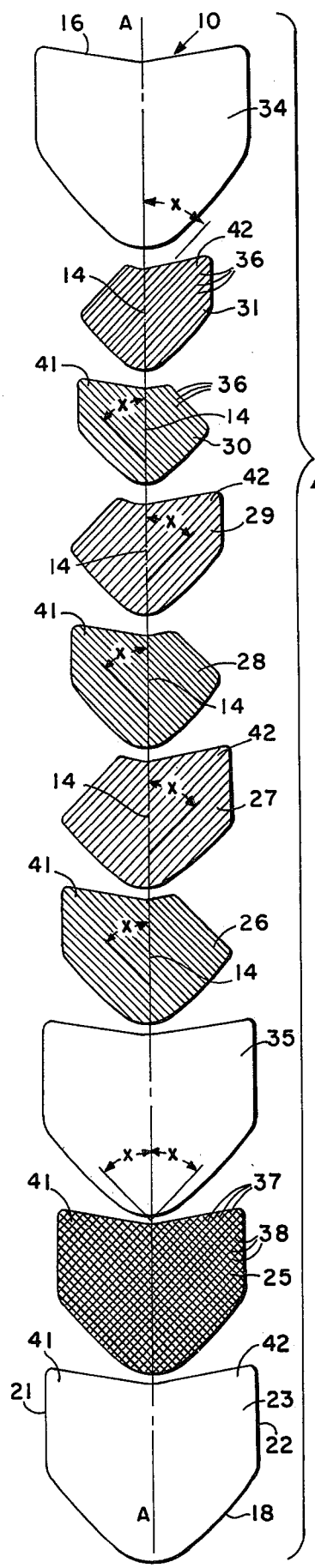
FIG. 5 is an exploded view illustrating the construction of the tire patch of FIGS. 1-4.

Referring to FIGS. 1, 3 and 4, a tire sidewall repair patch 10 is shown bonded to the sidewall 11 of a tire 12 having an injury 13 which may be a break or puncture in the sidewall. With reference to FIGS. 2, 3 and 4, the patch 10 has a central portion 14 for positioning over the tire injury 13 and an inner margin 15 having an inner edge 16 with a generally concave configuration to conform with the shape of a bead portion 17 of the tire 12.

The patch 10 has an outer edge 18 spaced from the inner edge and is preferably curved in a convex shape, as shown, to reduce edge pulling. Spaced side edges 21 and 22 extend between the outer edge 18 and the inner edge 16 and are joined to the outer edge in a smooth curve to reduce edge pulling.

The patch 10 is of a laminated construction and may include a base cushion gum layer 23, overlapping plies 25, 26, 27, 28, 29, 30 and 31, and a top cushion gum layer 34. The patch may also include an intermediate cushion gum layer 35 to provide a laminated construction similar to that disclosed in copending patent application Ser. No. 167,460, filed July 10, 1980, now U.S. Pat. No. 4,285,382 having the same inventors.

In the embodiment shown, the plies 26 through 31 are of reinforcing cords 36 which may be of nylon and have from ten to forty ends per inch and be of a 2200 denier. Alternatively, the cords 36 may be of nylon, polyester, polyamides or wire. The cords 36 of the plies 26 through 31 may have a skim coat of rubber such as natural or SBR rubber applied as by calendering and have a thickness of from 0.018 to 0.025 inches with a calendered thickness of from 0.023 to 0.035 inches. Alternatively, the cords 36 may be coated with reclaim, a blend of natural and SBR or a blend of natural, reclaim and SBR rubbers.

The ply 25 is of square woven fabric made up of reinforcing cords 37 and 38 which may be of nylon and may have from ten to forty ends per inch and be of a 2200 denier. The cords 37 and 38 of the reinforcing ply 25 may have a skim coat of rubber such as natural or SBR rubber applied as by calendering and have a thickness of from 0.018 to 0.025 inches with a calendered thickness of from 0.023 to 0.035 inches. The ply 25 has a configuration substantially the same as the configuration of the base cushion gum layer 23 and intermediate cushion gum layer 35 and top cushion gum layer 34 but is smaller so that the edges of the cushion gum layers overlap.

The plies 26 through 31 are preferably layers of reinforcing cords 36 cut to configurations which are substantially the same shape as the configuration of the patch 10 except that the pair of plies 26 and 27 are smaller than ply 25. The pair of plies 28 and 29 are smaller than the pair of plies 26 and 27, and the pair of plies 30 and 31 are smaller than plies 28 and 29. The reinforcing cords 36 of the plies 26 through 31 preferably extend at an angle X to the centerline A—A of the patch 10, as shown in FIGS. 2 and 5. The angle X is preferably the same angle as the angle of the cords in the sidewall 11 of the tire 12 and in a bias tire are usually around 45 degrees. The plies 26 through 31 are in a crisscross relationship with the cords 36 of adjacent plies of each pair being positioned at substantially right angles. Also, the larger plies are closer to the intermediate cushion gum layer 35 and the smaller plies are closer to the top cushion gum layer 34. The cords 37 and 38 of ply 25 are also positioned at substantially right angles and at an angle X relative to the centerline A—A of the patch 10.

As shown in FIGS. 1, 2, 4 and 5, the patch 10 has side portions 41 and 42 of the inner margin 15 at each side of the central portion 14. These side portions 41 and 42 have a reduced thickness due to the fact that the cords 36 of the plies 26 through 31 extend into only one of the side portions and therefore reduce the thickness and increase the flexibility of the patch 10 at the side portions. For example, cords 36 of plies 26, 28 and 30 extend into only the side portion 41 of the inner margin 15. Also the cords 36 of plies 27, 29 and 31 extend into only the side portion 42 of the inner margin. This results in a reduction of three plies to provide increased flexibility of the patch in the area of the side portions 41,42. At the same time the reinforcing cords 36 of the plies 26 through 31 extend through the central portion 14 so that there will be a concentration of the plies there to provide strength where the patch covers the tire injury 13.

As shown in FIGS. 3, 4 and 5, the base, intermediate and top cushion gum layers 23, 35 and 34 are preferably of a resilient rubberlike material such as natural rubber and, alternatively, of SBR rubber, a blend of natural and SBR rubbers, or a blend of polybutadienes having a thickness greater than the thickness of any of the plies 25 through 31. In the embodiment shown, the base cushion gum layer 23 has a thickness of 0.090 inches, the intermediate cushion gum layer 35 has a thickness of 0.060 inches and the top cushion gum layer 34 has a thickness of 0.060 inches. The edges of the base, intermediate and top cushion gum layers 23, 35 and 34 are overlapped at edges 16, 18, 21 and 22 to provide a cushioning edge of the patch 10. The base, intermediate and top cushion gum layers 23, 35 and 34 are referred to as separate layers from the plies 25 through 31; however, in the fabrication of the patch 10 it is understood that these layers may be applied by calendering or laminating them to one or more of the reinforcing plies without departing from the spirit or scope of the invention.

The tire sidewall repair patch 10 may be built in the uncured condition and compressed by suitable means such as rolling so that substantially no air remains in the patch. The base, intermediate and top cushion gum layers 23, 35 and 34, and the plies 25 through 31 will be held together by the natural tack of the rubber in the patch 10. The patch 10 is then covered by polyethylene or some other material which can be removed when the patch is to be used.

As shown in FIGS. 3 and 4, the tire 12 has reinforcing plies 43. A plug 44 of resilient rubberlike material such as natural or SBR rubber is inserted at the tire injury 13 which has been skived with a V-shaped taper as shown in FIG. 3.

The application of the patch 10 to the tire sidewall 11 follows the procedure well known to those skilled in the art wherein an inner surface 45 of the tire sidewall 11 around the injury 13 is cleaned and buffed. A patch 10 of an appropriate size is selected and applied with the central portion 14 over the injury 13 and the inner edge 16 facing the bead portion 17. The centerline A—A of the patch 10 is aligned with the radius of the tire. The repair is finished by using either the heat vulcanizing method, the semicure method or the chemical cure method. In the heat vulcanizing method, the protective film is removed from the patch 10 and the patch installed with no distortion and stitched thoroughly from the center portion 14 to the edges 16, 18, 21 and 22. The tire 12 is then placed in a section mold or kettle and the patch 10 cured in a conventional approved manner.

The patch 10 may also be cured by the semicure method or the chemical cure method.

Figure 6:
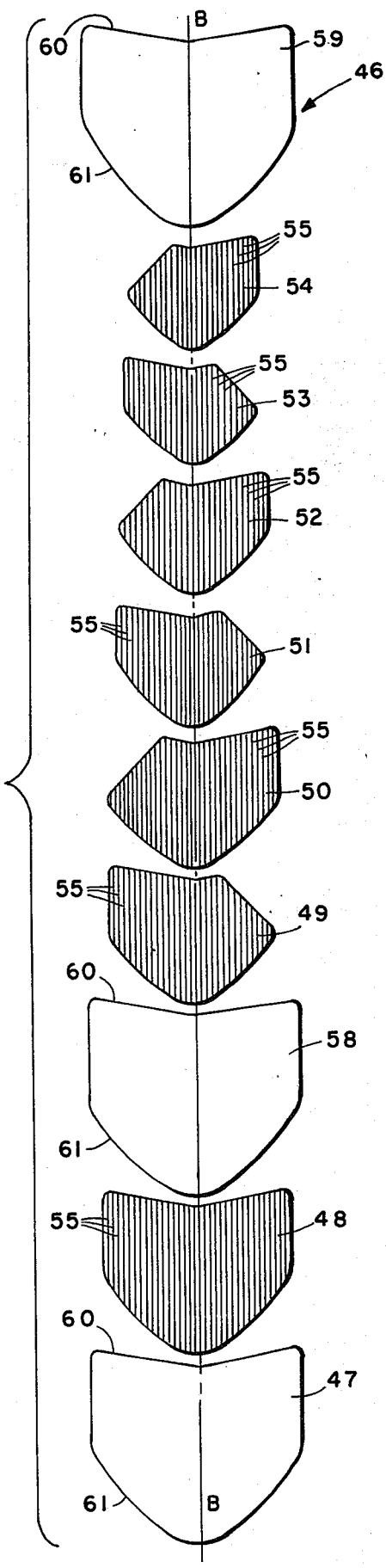
FIG. 6 is an exploded view showing the construction of a modification suitable for repairing radial tires.

Referring to FIG. 6, a modified form of the invention is shown in which a tire sidewall repair patch 46 for repairing sidewalls of radial tires where the reinforcing cords of the tire extend radially. The patch 46 has a base cushion gum layer 47, plies 48 through 54 of reinforcing cords 55, an intermediate cushion gum layer 58 and a top cushion gum layer 59. The plies 48 through 54 have a similar configuration to the plies 25 through 31 of the embodiment shown in FIG. 5 and the cushion gum layers 47, 58 and 59 have the same construction as the cushion gum layers 23, 35 and 34 of the embodiment shown in FIG. 5. In order to patch a radial tire where the reinforcing cords of the tire extend in a radial direction, the reinforcing cords 55 extend from an inner edge 60 to an outer edge 61 of the patch 10 in a direction parallel to the centerline B—B which is positioned in a radial direction when the patch is applied to the sidewall of the tire. Accordingly all of the cords 55 of the plies 48 through 54 extend in the same direction.

It is understood that other tire sidewall repair patch constructions in accordance with this invention may be provided in which the number and kind of plies and cushion gum layers are altered depending upon the strength required of the patch.

While certain representative embodiments and details have been shown for the purpose of demonstrating the invention, it will be apparent to those skilled in the art that various changes and modifications may be made therein without departing from the spirit or scope of the invention.

We claim:

1. A tire sidewall repair patch for application to the inner surface of a tire sidewall at a tire sidewall injury comprising a plurality of overlapping plies of reinforcing cords, a central portion for positioning over said tire injury, an inner margin having an inner edge adapted to conform generally to the shape of the bead portion of a tire, some of said plies of reinforcing cords extending into only one side portion of said inner margin and an additional number of said plies extending into only the other side portion of said inner margin so that there will be a concentration of said plies at said central portion to provide strength and a reduction in plies in each said side portion to provide flexibility of said patch in the area of the side portions of said patch.

2. A tire sidewall repair patch in accordance with claim 1 wherein said plurality of plies includes pairs of plies and one ply of each of said pairs extends into said one side portion and the other ply of each of said pairs extends into said other side portion.

3. A tire sidewall repair patch in accordance with claim 2 wherein the reinforcing cords of said one ply are positioned at an angle to the reinforcing cords of said other ply of each of said pairs of plies.

4. A tire sidewall repair patch in accordance with claim 3 wherein said angle between said reinforcing cords of said one ply and said reinforcing cords of said other ply is about 45 degrees.

5. A tire sidewall repair patch in accordance with claim 4 wherein said reinforcing cords of said one ply and of said other ply extend from said one side portion and said other side portion into said central portion.

6. A tire sidewall repair patch in accordance with claim 1 including an outer edge spaced from said inner edge, spaced side edges extending between said outer edge and said inner edge wherein said side edges join said outer edge in a smooth curve to reduce edge pulling.

7. A tire sidewall repair patch in accordance with claim 1 wherein said outer edge is curved to reduce edge pulling.

8. A tire sidewall repair patch in accordance with claim 1 further comprising an intermediate cushion gum layer interposed between at least two of said plies of reinforcing cords, each of said plies being coated with rubber and having a thickness less than the thickness of said intermediate cushion gum layer.

9. A tire sidewall repair patch in accordance with claim 8 wherein at least one of said plies of reinforcing cords is woven of reinforcing cords and positioned adjacent said intermediate cushion gum layer.

10. A tire sidewall repair patch in accordance with claim 8 further comprising a base cushion gum layer underlying said plies at an underside of said patch for engagement with said sidewall surface of the tire, and a top cushion gum layer overlying said plies at the top of said patch.

11. A tire sidewall repair patch in accordance with claim 1 wherein the reinforcing cords of each of said plies extend in the same direction.

12. A tire sidewall repair patch in accordance with claim 11 wherein the direction in which said plies extend is from said inner edge to said outer edge so that in use with a radial tire said reinforcing cords will be parallel to the cords in said tire.

* * * * *